(12) United States Patent
Pinkerton et al.

(10) Patent No.: US 6,255,743 B1
(45) Date of Patent: Jul. 3, 2001

(54) METHOD AND APPARATUS FOR PROVIDING AN UNINTERRUPTIBLE SUPPLY OF ELECTRIC POWER TO A CRITICAL LOAD

(75) Inventors: Joseph F. Pinkerton, Austin; David B. Clifton, Leander, both of TX (US)

(73) Assignee: Active Power, Inc., Austin, TX (US)

( * ) Notice: Subject to any disclaimer, the term of this patent is extended or adjusted under 35 U.S.C. 154(b) by 0 days.

(21) Appl. No.: 09/318,728

(22) Filed: May 26, 1999

(51) Int. Cl.$^7$ .................................................. F02N 11/06
(52) U.S. Cl. .................. 290/40 C; 290/40 A; 290/40 B; 290/40 F; 290/52
(58) Field of Search ................ 290/40 A–40 F, 290/52; 60/39.5

(56) References Cited

U.S. PATENT DOCUMENTS

| | | | |
|---|---|---|---|
| 4,059,770 | 11/1977 | Mackay | 290/4 |
| 4,224,797 | * 9/1980 | Kelly | 60/652 |
| 4,295,334 | * 10/1981 | Johnson | 60/669 |
| 4,402,647 | * 9/1983 | Effenberger | 415/90 |
| 4,652,207 | * 3/1987 | Brown et al. | 415/90 |
| 4,655,679 | * 4/1987 | Giacomel | 415/90 |
| 4,686,375 | * 8/1987 | Gottfried | 290/2 |
| 4,754,607 | * 7/1988 | Mackay | 60/723 |
| 4,935,650 | 6/1990 | Hannan, III | 310/11 |
| 5,434,454 | * 7/1995 | Farkas | 290/4 R |
| 5,536,976 | * 7/1996 | Churchill | 307/11 |
| 5,553,454 | 9/1996 | Mortner | 60/409 |
| 6,031,294 | 2/2000 | Geis et al. | 290/52 |
| 6,032,459 | * 3/2000 | Skowronski | 60/39.511 |
| 6,064,122 | 5/2000 | McConnell | 290/32 |
| 6,093,975 | 7/2000 | Peticolas | 290/52 |

FOREIGN PATENT DOCUMENTS

| | | | |
|---|---|---|---|
| 198 33 420 | 10/1999 | (DE) | 290/52 |
| 0 734 113 | 9/1996 | (EP) | 290/52 |
| 10-257696 | 9/1998 | (JP) | 290/52 |

* cited by examiner

*Primary Examiner*—Elvin Enad
(74) *Attorney, Agent, or Firm*—Fish & Neave; Robert W. Morris

(57) ABSTRACT

An uninterruptible power supply (UPS) system supplies electric power to computers, medical apparatus or other critical loads when a primary power supply fails. The UPS system includes an electrical machine drivingly connected to a turbine which can be rotated by a motive fluid from a fluid supply. The electrical machine can be a dual purpose electrical machine (a motor/generator) or a two unit machine (one motor and one generator in a single housing or in separate housings) drivingly connected to a turbine which can be rotated by a motive fluid supply. When power is supplied from the primary power supply to the critical load, the electrical machine acts as a motor to rotate the turbine, and energy is stored by the turbine rotor in the form of rotational momentum. When power from the primary power supply fails, the rotational momentum of the turbine rotor initially rotates the electrical machine which acts as a generator to provide power to the critical load. If the power loss or failure is extended, the turbine motor is driven by combustion products, steam, compressed gases or other motive fluids to maintain the rotary motion of the turbine and the generator.

50 Claims, 3 Drawing Sheets

METHOD AND APPARATUS FOR PROVIDING AN UNINTERRUPTIBLE SUPPLY OF ELECTRIC POWER TO A CRITICAL LOAD

BACKGROUND OF THE INVENTION

This invention relates to uninterruptible power supply (UPS) systems which provide electric power to critical loads when primary power supplies fail due to total power losses or deterioration which is that the power does not satisfy the end users' requirements.

UPS systems are widely used to assure that, when a primary power supply fails due to equipment malfunction, downed lines or other reasons, electric power will continue to be supplied to critical loads such as hospital operating room equipment, computer systems and computerized manufacturing equipment. UPS systems avoid equipment failures, costly downtime and equipment damage.

UPS systems traditionally take two basic forms, inverter-based and rotary. A typical inverter-based UPS system has a utility-powered rectifier connected to a DC buss which charges a string of chemical storage batteries. When the primary power supply fails, electronic circuitry converts direct current from the batteries into alternating current which operates the critical load. In an off-line or line-interactive UPS, this AC output is used to power the critical load only when power is unavailable from the primary power supply. In a double conversion UPS, the AC output provides power to the critical load at all times.

A typical rotary UPS uses a motor which drives a generator. The generator supplies alternating current to the critical load at all times. The motor is typically a DC motor that is driven during normal operations by rectified DC from the primary power supply, and driven during primary power supply interruptions by a battery string. During very brief power interruptions, the rotational momentum of the motor and generator can supply power to the critical load.

For inverter-based and rotary UPS systems, flywheel systems are available as a clean and reliable alternative or complement to chemical batteries. Such flywheel systems include a flywheel connected to an electrical machine which can operate as a motor and as a generator. The electrical machine is powered by the DC buss to operate as a motor when acceptable power is being received from the primary power supply. When power from the primary power supply fails, the electrical machine is rotated by the kinetic energy of the flywheel, and it acts as a generator to supply power to the DC buss.

Large UPS systems in the range of 20KW to 2 MW often use prime movers (fuel-burning engines) to drive backup generators during prolonged power outages. The prime movers are costly and complicated, and they require extensive ongoing maintenance. The engines may fail to start, resulting in loss of power to the critical load. In some localities, ordinances limit the running time or the number of starts per year of the engines for backup generators, which limits testing and overall usefulness of such systems.

Energy storage systems currently used to provide power to a DC buss are expensive and complicated. In battery energy storage systems, there is a risk that undetected battery damage or corrosion of battery terminals will result in a failure to deliver power when needed. Batteries have a limited life and they require expensive ventilation, drainage, air conditioning and frequent maintenance. Flywheel energy storage systems, while avoiding most disadvantages of batteries, are expensive since they are mechanically complex and they require complicated power electronics.

In some existing systems, power from the primary power supply is rectified and transmitted to a DC buss, converted to low frequency AC by a converter, and used to power a critical load. The associated UPS system has a high speed gas turbine, and a backup generator driven by the turbine. The backup generator is a brushless permanent magnet alternator which generates high frequency AC which is rectified and transmitted to the DC buss. The DC output buss provides power to an inverter, and the inverter converts the DC to a low frequency AC which powers the critical load. When the power from the primary power supply is present, the turbine rotor is stationary. When a brief outage occurs, a battery string supports the DC buss. When there is an extended power failure, a battery is connected to the generator which then, acting as a motor, brings the turbine rotor up to speed. When a predetermined minimum speed is attained, fuel is supplied to the gas turbine to sustain the rotation of the turbine, and power from the generator is supplied to the DC buss. Such systems are expensive and complicated compared to the present invention because they require a separate energy storage system.

A primary object of the present invention is to provide a UPS which is less complicated and less expensive than existing battery/generator/turbine UPS systems of the type described above.

SUMMARY OF THE INVENTION

In one respect, the method of the invention is performed by supplying electric power from said primary power source to said motor means to rotate said turbine rotor which stores kinetic energy as rotational momentum; and, operating said apparatus in an emergency mode in which said machine rotor is rotated by rotational momentum of said turbine rotor to supply electric power to a critical load.

Preferably, the turbine rotor includes a plurality of parallel discs which are separated by spaces, and the method includes the step of introducing motive fluid from the fluid supply into peripheral regions of said spaces to rotate said turbine rotor. The motive fluid may be provided by (1) burning a fuel to produce an exhaust gas, and using said exhaust gas as said motive fluid (2) providing a source of compressed gas, and using said compressed gas as said motive fluid, or (3) boiling water to produce steam, and using said steam as said motive fluid.

According to the preferred method, the primary power source is disconnected from the critical load when the primary power source fails. The electric power supplied to the critical load may be direct current or alternating current.

In another respect, the method of the invention is performed by supplying electric power to a rotary electrical machine which is operating in a motor mode, while transmitting rotational motion from said electrical machine to a rotor of a turbine whereby said rotor stores kinetic energy in the form of rotational momentum; transmitting said rotational momentum of said rotor to said electrical machine when the primary power source fails; and, operating said electrical machine in a generator mode to supply electric power to said critical load. Preferably, a flow of motive fluid to said rotor is directed to the rotor to prevent its rotational deceleration.

In yet another respect, the method of the invention includes the steps of (1) operating an apparatus in a non-emergency mode in which power is supplied from the primary power supply to said electrical machine, said fluid supply is inactive, and said electrical machine rotates said turbine rotor which stores kinetic energy as rotational momentum; and, (2) activating said fluid supply to direct motive fluid to the turbine rotor to sustain rotation of the turbine rotor and the electrical machine rotor to generate electric power which is supplied to the critical load. Preferably, after the primary power supply has failed and before the fluid supply is activated, the apparatus is operated in a transitional mode in which rotational momentum of said turbine rotor rotates said electrical machine rotor to generate electric power which is supplied to the critical load.

When the electrical machine has a motor unit and a generator unit which have separate windings from each other, and the apparatus is operating in its non-emergency mode, said motor unit drives said generator unit, and said generator unit generates electric power for the critical load. When said electrical machine includes a dual purpose unit which operates as a motor at some times and as a generator at other times, said unit is operated as a motor when the apparatus is in its non-emergency mode and it is operated as a generator when the apparatus is in its emergency mode.

DETAILED DESCRIPTION

Figure 1:
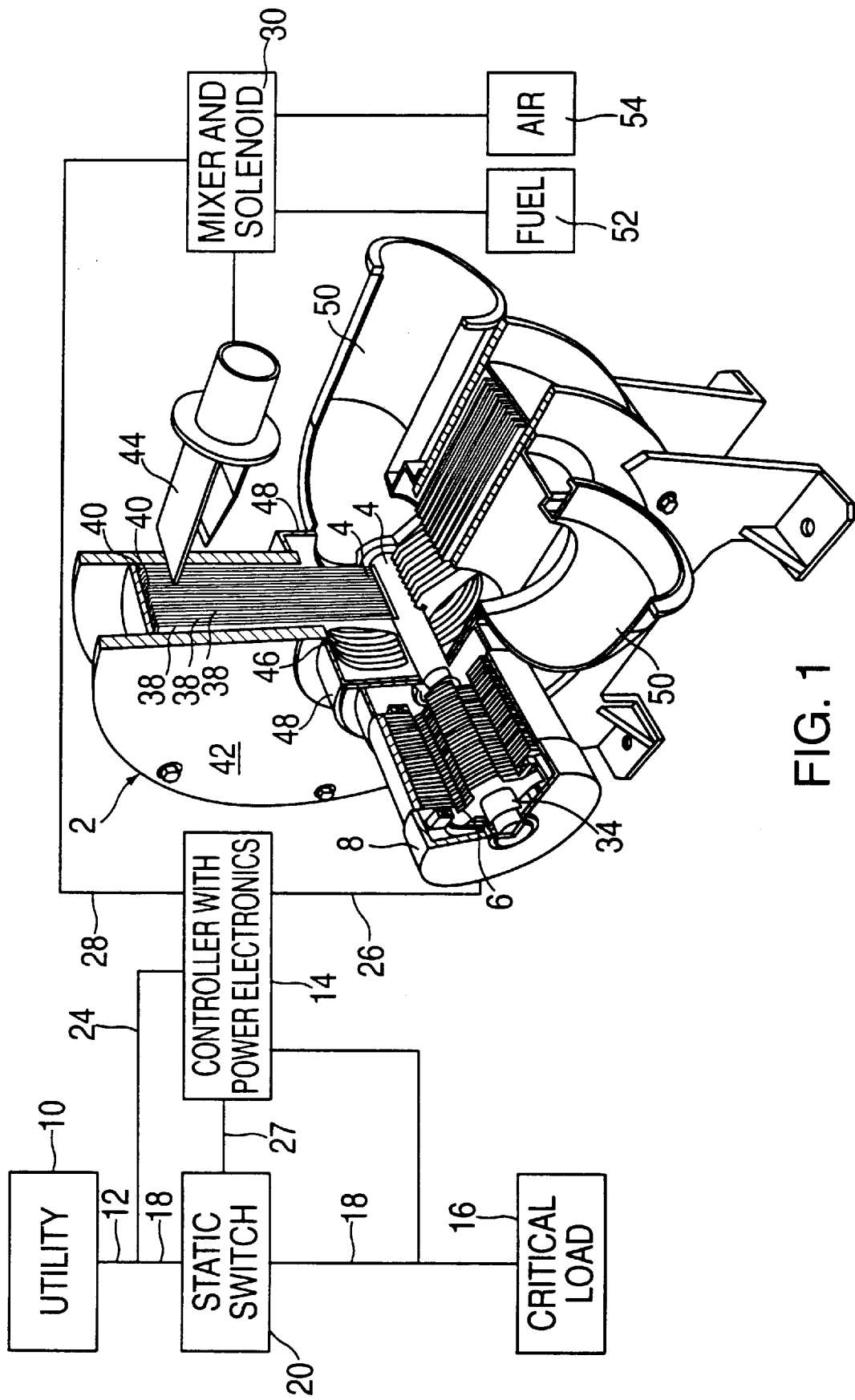
FIG. 1 is a schematic view of a first embodiment of the invention, including a fragmentary view of a preferred turbine design.

In the system of FIG. 1, a turbine 2 has its rotor 4 drivingly connected to the rotor 6 of a rotary electrical machine 8 which is operable, at different times, as a motor and as a generator. The shafts of the turbine rotor 4 and the electrical machine rotor 6 are coupled together, either directly or indirectly by gearing or other means, so that the electrical machine rotor 6 can drive the turbine rotor 4, and the turbine rotor can drive the electrical machine rotor. Many kinds of motor/generator machines 8 can be used but, due to their simplicity and low cost, switched reluctance machines and homopolar inductor alternator machines are preferred.

The primary power supply represented schematically by box 10 in FIG. 1 can be an electric utility, a cogenerator, a small power producer, or a user-operated system; and it can include generation facilities, transmission lines, distribution networks and other components known in the industry.

At the end user's site, there is a controller 14 and a critical load 16 (a computer system, automated manufacturing equipment, etc.) which normally receives electric power from the primary power supply via the distribution line 12, a local conductor 18, and a normally closed static switch 20. The controller 14 includes power electronics of a type known in the art which can drive the electrical machine at a variable frequency. The power electronics can also receive power from the electrical machine at a variable frequency and convert it to a constant frequency to power the critical load.

The controller 14 has an input line 24 connected to the transmission line, a power line 26 connected to the motor/generator 8, a control line 27 connected to the static switch 20, and a control line 28 connected to a combustion system 30. The combustion system 30 and the nozzle 44 constitute a fluid supply which is normally inactive but is capable, when activated, to direct a flow of, motive fluid (exhaust gases) against the turbine rotor 4 to rotate the turbine.

Preferably, the turbine 2 is a Tesla turbine of the type disclosed in U.S. Pat. No. 1,061,206, the contents of which are incorporated herein by reference. The Tesla turbine 2 shown in FIG. 1 has a rotor shaft 34 and a plurality of parallel discs 38 which are rotationally fixed to the shaft and are separated by annular spaces 40. A stationary housing 42 encloses the discs. A fluid supply includes a tangential nozzle 44 for introducing steam, combustion products, or other motive fluids tangentially into the housing 42, and into the peripheral regions of the spaces 40 between the discs 38. The boundary layer effect of the motive fluid on the surfaces of discs 38 rotates the turbine rotor, and the fluid moves in an inward spiral toward the turbine shaft. The fluid exits from the spaces 40 via aligned exhaust holes 46 in the discs, and it flows into opposed exhaust chambers 48 which lead to exhaust conduits 50. Axial thrust on the rotor is minimized by using this opposed dual exhaust system. If desired, a flywheel may be mounted on the turbine shaft to provide a greater moment of inertia and angular momentum.

Combustion products are the preferred motive fluid for the turbine. Such combustion products are generated by the combustion system 30 which receives and mixes fuel and air from a fuel supply 52 and an air supply 54. The combustion system ignites and burns the fuel, and the resulting exhaust gases are directed by the turbine nozzle 44 against the turbine rotor to drive the turbine.

The turbine system may have conventional components known in the art, including compressors for fuel and air, igniters, separate combustion chambers, cooling systems and various devices such as recuperators that are used to improve turbine efficiency.

The Tesla turbine has a number of advantages over traditional bladed turbines, including: simplicity of construction, low cost, high tolerance for particulate contaminants in the air and fuel, reduced maintenance requirements, low audible noise, adaptability for use with multiple fuels, low rotor stress concentrations, high moment of inertia per unit of mass, high moment of inertia per unit of volume, ability to operate at higher tip speeds, ability to store more energy as angular momentum, and reduced thrust bearing requirements when opposed dual exhausts are used.

When the primary power supply is functioning normally, the static switch 20 is on, and the critical load 16 is powered by the primary power supply through the static switch 20. Power from the primary power supply also powers the controller 14 and the motor/generator machine 8 which acts as a motor to keep the turbine 2 rotating against windage and bearing losses. The turbine rotor stores kinetic energy as rotational momentum.

When the controller 14 detects a failure in the primary power supply, as when there is a total power loss or when the waveform does not satisfy specifications determined by firmware, software or both, the controller 14 changes the signal in line 27 to turn off the static switch 20, and the UPS system then operates in a transitional mode in which the momentum of the turbine rotor 4 rotates the rotor of the electrical machine 8.

The output of generator 8 will have a high frequency which will decrease as the rotor slows down due to dissipation of angular momentum. The controller 14 includes known power electronic circuitry which converts the generator output to standardized alternating current which has a voltage and a frequency corresponding to those normally provided by the primary power supply to the critical load, typically 60 Hz. When the system is operating in the transitional mode, no energy is supplied to the turbine, and the combustion system 30 is inactive.

After the turbine rotor 4 has decelerated to a predetermined angular velocity due to dissipation of its rotational momentum, the controller 14 initiates the emergency mode of the system by sending a signal via line 28 to activate the combustion system 30. The combustion system ignites a fuel-air mixture to produce exhaust gases in a manner well known in gas turbine technology. These exhaust gases are directed against the rotor by the nozzle 44, and they act as a motive fluid to rotate the turbine rotor 4 and the coupled electrical machine rotor 6 which continue to generate electric power for the critical load 16 until the fuel supply is exhausted.

Figure 2:
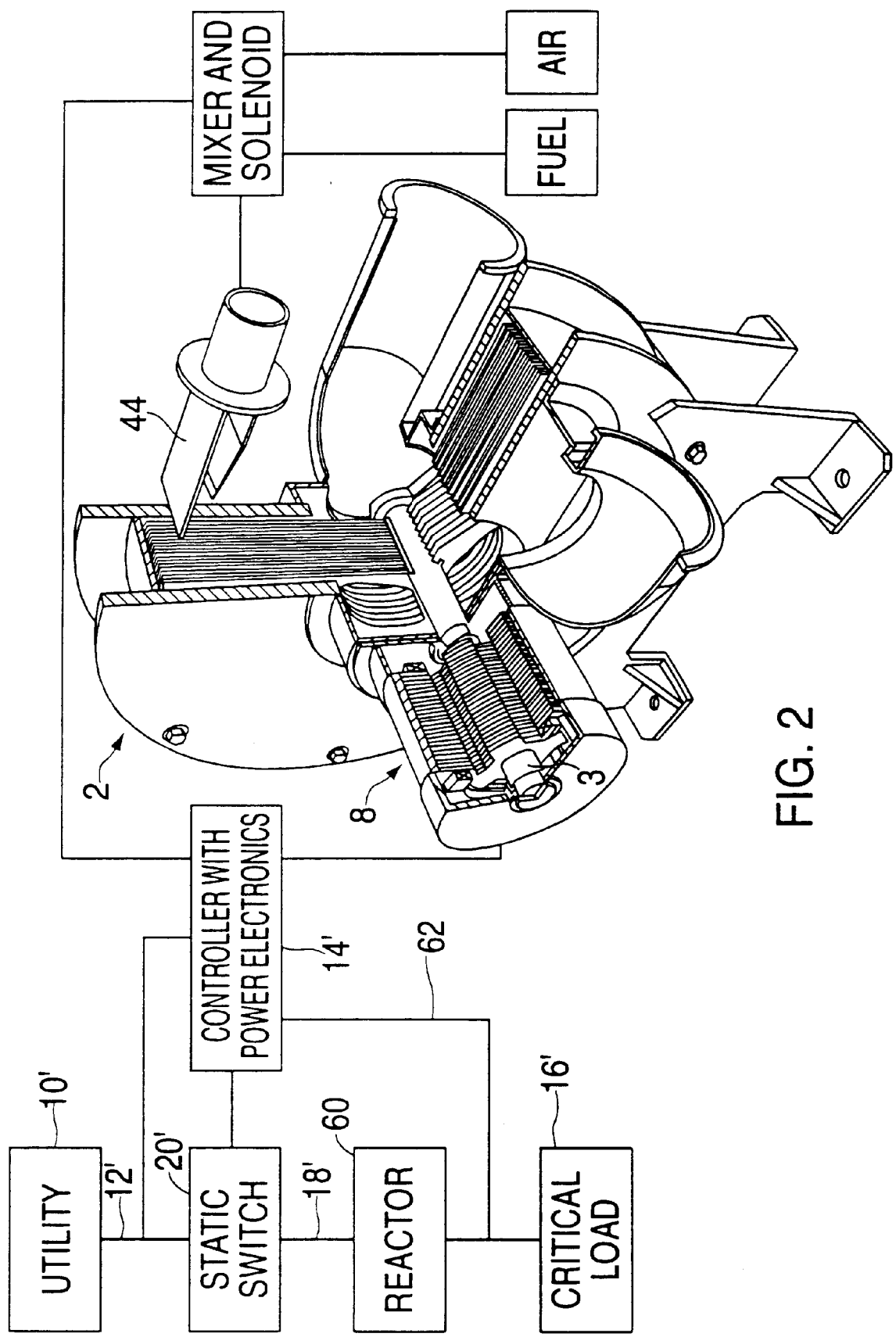
FIG. 2 is a schematic view of a second embodiment of the invention which is similar to the embodiment of FIG. 1 but includes circuitry for correcting small disturbances in the power from the primary power supply by making waveform injections into the power transmitted to the critical load.

The embodiment of FIG. 2 is similar in most respects to the apparatus shown in FIG. 1, but it has a reactor 60, usually an inductor, in the local conductor 18' which connects the static switch 20' to the critical load 16'. The controller 14' in FIG. 2 performs the same functions as the controller 14 in FIG. 1. It makes line interactive corrections when there are small disturbances to the power received from the distribution line 12'. The controller 14' these disturbances, and its power electronics generate a corrective waveform which, as is known in the art, is injected by line 62 into the local conductor 18' on the load side of the reactor 60. Energy for these injections can come from the distribution line 12' to the controller 14', from small energy storage elements such as capacitors in the controller 14' and from the angular momentum of the turbine when the electrical machine 8 operates briefly as a generator.

It is believed that the systems of FIGS. 1 and 2 will achieve efficiencies of about 98% while powered by the primary power supply. The only losses are attributable to electrical spinning of the turbine and to dissipation in the static switch and reactor. Air pollution caused by the turbine exhaust is substantially lower than that from a typical diesel engine, so longer legally permissible running times are possible. Turbines fired by natural gas or propane are typically allowed to operate indefinitely.

Figure 3:
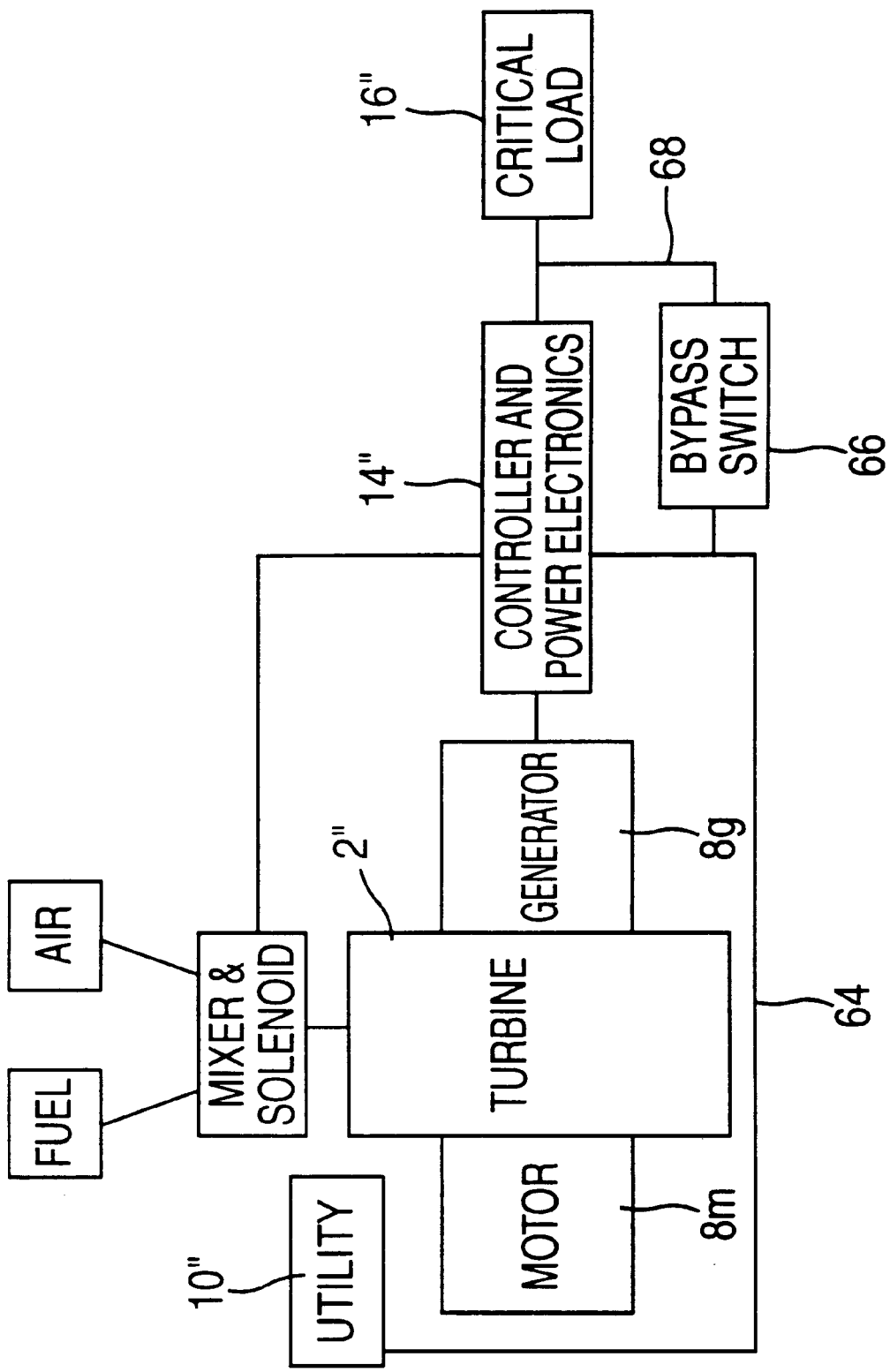
FIG. 3 is a block diagram of a third embodiment of the invention in which the UPS is on-line in the respect that it supplies power to the critical load when suitable power is available and when the primary power supply has failed.

FIG. 3 is a block diagram of a third embodiment of the invention. This is an on-line UPS system in which the load 16" is completely isolated from the waveform properties of the primary power supply 10" at all times. In this embodiment, the electrical machine includes the motor unit 8m and a generator unit 8g which are located on opposite sides of a conventional gas turbine 2". The shafts of the motor unit 8m, gas turbine 2" and generator unit 8g are drivingly connected together. The motor unit has rotor and stator windings which are independent from the rotor and stator windings of the generator unit. The motor and generator units are shown in separate housing but, if desired, they can be in a single housing. The motor and generator units 8m, 8g simultaneously perform their respective functions as a drive motor and as an electrical generator.

The motor 8m is driven by power from the primary power supply 10" and it keeps the turbine 2" spinning while the primary power supply is "up". If switched reluctance or high frequency (greater than 60 Hz) homopolar inductor alternator machines are used, a power electronics drive is used because such machines cannot be directly connected to the primary power supply. The output of generator 8g powers the critical load 16" at all times.

The power electronics can be omitted from the controller 14" in situations which do not require precise frequencies and voltages. For example, a turbine with a high angular momentum may be driven at a speed which causes the generator output to be at a desired frequency such as 60 Hz. If the primary power supply fails, the rotational momentum of the turbine rotor and any flywheel which may be attached to it will be great enough to maintain a near-60Hz frequency and an acceptable voltage until the turbine combustion system is activated.

The controller 14" has power conversion electronics which convert the generator's output to clean sinusoidal AC at the normal frequency and voltage of the primary power supply. The power converter electronics are always "warmed up" and driving the full power of the load. Although FIG. 3 shows the motor 8m and generator 8g as separate entities on opposite sides of the turbine, they can be incorporated into a single machine with separate windings or other arrangement which enable it to operate simultaneously as a motor and generator.

If the UPS system of FIG. 3 fails or requires maintenance, power from the primary power supply 10 can optionally bypass the motor/turbine/generator set and be fed directly to the critical load 16. Such bypass power is fed from the primary power supply via lines 64 and a bypass switch 66.

The motor 8m in the embodiment of FIG. 3 may be a standard inexpensive induction motor driven directly by the primary power supply. If the turbine rotor has a sufficiently high moment of inertia relative to the output torque of motor unit 8m, the motor unit 8m may be electrically connected to the primary power source by a variable speed drive (VSD), not shown, which is used when the turbine rotor is accelerated from a dead stop to its normal operational velocity. Once the VSD brings the rotor to speed, a relay connects the motor 8m directly to the primary power supply for efficient full-power operation. This relay is open during primary power supply outages.

The on-line configuration shown in FIG. 3 is believed by some users to achieve the ultimate in power quality and reliability. However, it is more expensive than the embodiments shown in FIGS. 1 and 2 because it requires two rotating electrical machines or one larger machine capable of continuous simultaneous operation as a motor and as a generator at the rated power. The efficiency of this configuration is typically 90 to 94%. This is lower than the efficiency of the embodiments of FIGS. 1 and 2 because, in the FIG. 3 embodiments, the two rotating electrical machines operate continuously at their rated power.

From the foregoing description, persons skilled in the art will recognize that this invention provides effective, uncomplicated, low maintenance, and relatively inexpensive ways of providing an uninterrupted supply of electrical power to a critical load. It will also be recognized that the invention may take many forms other than those disclosed in this specification. Accordingly, it is emphasized that the invention is not limited to the disclosed methods and apparatuses, but is intended to include variations to and modifications thereof which are within the spirit of the following claims.

We claim:

1. Uninterruptible power supply apparatus for receiving electric power from a primary power source and for supplying electric power to a critical load when the primary power source fails, said apparatus comprising:

a rotary electrical machine having a machine rotor, said electrical machine being electrically connectable to said primary power source and being operable in a motor mode when it receives electric power from the primary power source, said rotary electrical machine also being operable in a generator mode to supply electric power to a critical load;

a turbine having a rotor and a normally inactive fluid supply which, when active, supplies a flow of motive fluid to said rotor to rotate said turbine rotor;

said turbine rotor being drivingly connected to said machine rotor;

said apparatus being operable in a standby mode, a transitional mode and an active mode;

said electrical machine, when said apparatus is in standby mode, being in its motor mode to rotate said turbine rotor which stores kinetic energy as rotational momentum;

said electrical machine being in its generator mode when the apparatus is in its transitional mode, said rotational momentum of said turbine rotor being operable to rotate said electrical machine rotor when the apparatus is in its transitional mode to generate electric power which is supplied to a critical load;

said fluid supply being active when said apparatus is in its active mode to rotate the turbine rotor which rotates said electrical machine rotor to generate electric power for the critical load.

2. Apparatus according to claim 1 wherein the turbine rotor includes a plurality of parallel discs which are separated by spaces, said fluid supply introducing motive fluid to peripheral regions of said spaces, said turbine rotor having a fluid outlet passage which is radially inward of said peripheral regions.

3. Apparatus according to claim 1 wherein said motive fluid is an exhaust gas, and said apparatus includes a combustion chamber where fuel is burned to produce said exhaust gas.

4. Apparatus according to claim 1 wherein said motive fluid is steam.

5. Apparatus according to claim 1 wherein said motive fluid is pressurized gas.

6. Apparatus according to claim 1 including a controller which activates said fluid supply after the primary power source fails.

7. Apparatus according to claim 1 including a controller which connects the generator to the critical load after the primary power source fails.

8. Apparatus according to claim 1 including a controller which disconnects the primary power source from the critical load when the primary power source fails.

9. Apparatus according to claim 8 including a static switch between said primary power source and said critical load, said controller being operable to open said static switch when the primary power source fails.

10. Apparatus according to claim 1 including power electronics which have an input which receives electric power from said generator at a variable frequency which is a function of the rotational velocity of said generator means, said power electronics having an output which supplies electric power at a constant frequency to said critical load.

11. Apparatus according to claim 1 including a flywheel which is connected to and is rotatable with said turbine rotor.

12. Apparatus according to claim 1 including a flywheel which is rotated at a same angular velocity as said turbine rotor, said angular velocity being greater than zero in all operational modes.

13. Apparatus according to claim 1 wherein said electrical machine is rotated at a same angular velocity as said turbine, said angular velocity being greater than zero in all operational modes.

14. Apparatus according to claim 1 wherein said apparatus is operable to supply direct current to a critical load.

15. Apparatus according to claim 1 wherein said apparatus is operable to supply alternating current to a critical load.

16. Uninterruptible power supply apparatus for receiving electric power from a primary power source and for supplying electric power to a critical load, said apparatus comprising:

rotary electrical machine means having a machine rotor and including generator means and motor means;

a turbine having a turbine rotor which is drivingly connected to said machine rotor, said turbine having a normally inactive fluid supply which, when active, supplies motive fluid to rotate said turbine rotor;

said motor means being operable when supplied with electric power from the primary power source to rotate said turbine rotor which stores kinetic energy as rotational momentum;

said apparatus being operable in an emergency mode in which said machine rotor is rotated by rotational momentum of said turbine rotor to supply electric power to a critical load.

17. Apparatus according to claim 16 wherein the turbine rotor includes a plurality of parallel discs which are separated by spaces, said fluid supply introducing motive fluid to peripheral regions of said spaces, said turbine rotor having a fluid outlet passage which is radially inward of said peripheral regions.

18. Apparatus according to claim 16, wherein said fluid supply is activated when said apparatus is operating in its emergency mode.

19. Apparatus according to claim 16, wherein said generator means and said motor means have the same windings, said rotary electrical machine being operable at different times as said motor means and as said generator means.

20. Apparatus according to claim 16, wherein said generator means and said motor means have windings which are separate from each other, said motor means being operable in a non-emergency mode in which it receives electric power from said electrical distribution system and it rotates both said turbine rotor and said generator means, said generator means being electrically connected to a critical load when said motor means is operating in its non-emergency mode.

21. Apparatus according to claim 16 wherein said motive fluid is an exhaust gas, said apparatus including a combustion chamber where fuel is burned to produce said exhaust gas.

22. Apparatus according to claim 16 wherein said motive fluid is steam.

23. Apparatus according to claim 16 wherein said motive fluid is compressed gas.

24. Apparatus according to claim 16 including a controller which activates said fluid supply when the primary power source fails.

25. Apparatus according to claim 16 including a controller which connects the generator to the critical load when the primary power source fails.

26. Apparatus according to claim 16 including a controller which disconnects the primary power source from the critical load when the primary power source fails.

27. Apparatus according to claim 26 including a static switch between said primary power source and said critical load, said controller being operable to open said static switch when the primary power source fails.

28. Apparatus according to claim 16 including a flywheel which is connected to and is rotatable with said turbine rotor.

29. Apparatus according to claim 16 including a flywheel which is rotated at a same angular velocity as said turbine rotor, said angular velocity being greater than zero in all operational modes.

30. Apparatus according to claim 16 wherein said electrical machine is rotated at a same angular velocity as said turbine, said angular velocity being greater than zero in all operational modes.

31. Apparatus according to claim 16 wherein said apparatus is operable to supply direct current to a critical load.

32. Apparatus according to claim 16 wherein said apparatus is operable to supply alternating current to a critical load.

33. A method of supplying electric power to a critical load using an uninterruptible power supply apparatus which receives electric power from a primary power source, said apparatus including (i) rotary electrical machine means which has a machine rotor and includes generator means and motor means, and (ii) a turbine which has a turbine rotor drivingly connected to said machine rotor, said turbine having a normally inactive fluid supply which, when active, supplies motive fluid to rotate said turbine rotor, said method including the steps of:

supplying electric power from said primary power source to said motor means to rotate said turbine rotor which stores kinetic energy as rotational momentum; and, operating said apparatus in an emergency mode in which said machine rotor is rotated by rotational momentum of said turbine rotor to supply electric power to a critical load.

34. The method according to claim 33 in which the turbine rotor includes a plurality of parallel discs which are separated by spaces, said method including the step of introducing motive fluid from said fluid supply into peripheral regions of said spaces to rotate said turbine rotor.

35. The method according to claim 33 including the steps of burning a fuel to produce an exhaust gas, and using said exhaust gas as said motive fluid.

36. The method according to claim 33 including the steps of providing a source of compressed gas, and using said compressed gas as said motive fluid.

37. The method according to claim 33 including the step of boiling water to produce steam, and using said steam as said motive fluid.

38. The method according to claim 33 including the step of disconnecting the primary power source from the critical load when the primary power source fails.

39. The method according to claim 33, wherein the electric power supplied to the critical load is direct current.

40. The method according to claim 33, wherein the electric power supplied to the critical load is alternating current.

41. A method of providing uninterrupted electric power to a critical load when normal power from a primary power source fails, said method including the following steps:

supplying electric power to a rotary electrical machine which is operating in a motor mode, while transmitting rotational motion from said electrical machine to a rotor of a turbine whereby said rotor stores kinetic energy in the form of rotational momentum;

transmitting said rotational momentum of said rotor to said electrical machine when the primary power source fails, and operating said electrical machine in a generator mode to supply electric power to said critical load.

42. The method according to claim 41 including the step of directing a flow of motive fluid to said rotor to prevent rotational deceleration of said rotor.

43. The method according to claim 41, wherein the electric power supplied to the critical load is direct current.

44. The method according to claim 41, wherein the electric power supplied to the critical load is alternating current.

45. A method of operating an uninterruptible power supply apparatus which receives electric power from a primary power supply and supplies electric power to a critical load when the primary power supply fails, said apparatus including a rotary electrical machine which has a rotor and is electrically connectable to a primary power supply, said electrical machine being operable as a motor and as a generator, a turbine having a rotor and a normally inactive fluid supply which, when active, directs a flow of motive fluid on said turbine rotor to rotate said turbine rotor, said turbine rotor being drivingly connected to said electrical machine rotor; said method including the steps of:

operating said apparatus in a non-emergency mode in which power is supplied from the primary power supply to said electrical machine, said fluid supply is inactive, and said electrical machine rotates said turbine rotor which stores kinetic energy as rotational momentum;

activating said fluid supply to direct motive fluid to the turbine rotor to sustain rotation of the turbine rotor and the electrical machine rotor to generate electric power which is supplied to the critical load.

46. The method according to claim 45 wherein, after the primary power supply has failed, and before the fluid supply is activated, operating said apparatus in a transitional mode in which rotational momentum of said turbine rotor rotates said electrical machine rotor to generate electric power which is supplied to the critical load.

47. The method according to claim 45, wherein said electrical machine includes a motor unit and a generator unit which has separate windings from the motor unit and, when the apparatus is operating in its non-emergency mode, said motor unit drives said generator unit, and said generator unit generates electric power for the critical load.

48. The method according to claim 45, wherein said electrical machine includes a dual purpose unit which operates as a motor at some times and as a generator at other times, said unit being operated as a motor when the apparatus is in its non-emergency mode and being operated as a generator when the apparatus is in its emergency mode.

49. The method according to claim 45, wherein the electric power supplied to the critical load is direct current.

50. The method according to claim 45, wherein the electric power supplied to the critical load is alternating current.

* * * * *

UNITED STATES PATENT AND TRADEMARK OFFICE
CERTIFICATE OF CORRECTION

PATENT NO. : 6,255,743 B1
DATED : July 3, 2001
INVENTOR(S) : Pinkerton et al.

Page 1 of 1

It is certified that error appears in the above-identified patent and that said Letters Patent is hereby corrected as shown below:

<u>Column 5,</u>
Line 26, change "14' these" to -- 14' detects these --.

Signed and Sealed this

Fourteenth Day of May, 2002

*Attest:*

JAMES E. ROGAN
*Attesting Officer*  *Director of the United States Patent and Trademark Office*